(12) United States Patent
Beaver et al.

(10) Patent No.: US 9,075,519 B2
(45) Date of Patent: Jul. 7, 2015

(54) SYSTEM AND METHOD FOR INTERACTING WITH A DISPLAYED WORK SPACE

(71) Applicant: APPLE INC., Cupertino, CA (US)

(72) Inventors: Donald R. Beaver, Pittsburgh, PA (US); Gregory C. Langmead, Pittsburgh, PA (US)

(73) Assignee: APPLE INC., Cupertino, CA (US)

( * ) Notice: Subject to any disclaimer, the term of this patent is extended or adjusted under 35 U.S.C. 154(b) by 107 days.

(21) Appl. No.: 13/649,948

(22) Filed: Oct. 11, 2012

(65) Prior Publication Data

US 2014/0108997 A1  Apr. 17, 2014

(51) Int. Cl.
*G06F 3/0488* (2013.01)
*G06F 3/0484* (2013.01)

(52) U.S. Cl.
CPC ............ *G06F 3/0488* (2013.01); *G06F 3/0484* (2013.01)

(58) Field of Classification Search
None
See application file for complete search history.

(56) References Cited

U.S. PATENT DOCUMENTS

| | | | |
|---|---|---|---|
| 5,592,607 A * | 1/1997 | Weber et al. | 715/863 |
| 5,740,389 A | 4/1998 | Li et al. | |
| 5,786,805 A | 7/1998 | Barry | |
| 8,352,286 B1 * | 1/2013 | Bawa et al. | 705/2 |
| 8,607,156 B1 * | 12/2013 | Jania et al. | 715/787 |
| 2008/0082938 A1 * | 4/2008 | Buczek | 715/784 |
| 2008/0091752 A1 * | 4/2008 | Powles | 708/160 |
| 2009/0007007 A1 * | 1/2009 | Voros et al. | 715/786 |
| 2009/0070711 A1 * | 3/2009 | Kwak et al. | 715/829 |
| 2009/0164602 A1 * | 6/2009 | Kies et al. | 709/217 |
| 2009/0288044 A1 | 11/2009 | Matthews et al. | |
| 2011/0055752 A1 * | 3/2011 | Rubinstein et al. | 715/784 |
| 2012/0066621 A1 * | 3/2012 | Matsubara | 715/764 |
| 2012/0081317 A1 | 4/2012 | Sirpal et al. | |
| 2013/0014051 A1 * | 1/2013 | Lefor et al. | 715/787 |
| 2013/0135221 A1 * | 5/2013 | Ainslie et al. | 345/173 |
| 2013/0191220 A1 * | 7/2013 | Dent et al. | 705/14.64 |
| 2013/0283204 A1 * | 10/2013 | Pasquero et al. | 715/784 |

FOREIGN PATENT DOCUMENTS

| | | |
|---|---|---|
| EP | 0588686 A1 | 9/1993 |
| EP | 1703364 A2 | 9/2006 |
| EP | 2434388 A2 | 3/2012 |

* cited by examiner

*Primary Examiner* — Matt Kim
*Assistant Examiner* — Hua Lu
(74) *Attorney, Agent, or Firm* — Fletcher Yoder PC

(57) ABSTRACT

An application interface is provided that allows a user to interact with a work space. The application interface may include a defined display area that includes one or more discrete works spaces. In one implementation a user interaction with the defined display area, such as an overscroll interaction, results in the defined display area being modified, such as to include additional or fewer discrete work spaces.

14 Claims, 9 Drawing Sheets

SYSTEM AND METHOD FOR INTERACTING WITH A DISPLAYED WORK SPACE

BACKGROUND

The present disclosure relates generally to an application interface that allows a user to adjust, modify, or otherwise interact with a work space available when using the application.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various applications implemented on electronic devices allow a user of the application to create some form of content and/or to perform problem solving. Such applications may provide delineated or discrete areas with which the user interacts or generates content. For example, in a database or spreadsheet application, these discrete work spaces may be provided in the form of columns or rows. Likewise, in other types of applications, such as for note taking or mathematical problem solving, discrete work spaces may be provided as rows, with each row providing space for an additional note or an additional step in a problem solving process.

In contexts where such an application is implemented on a computer or similar device, a keyboard and/or mouse may be available as input devices and the user may use these devices to interact with menus or other control elements of the interface to both interact with the discrete work spaces and/or to add or delete such work spaces. However, other types of electronic devices do not provide for the use of such separate input devices and/or have a limited amount of display area. In such instances, an interface that relies on menus and/or inputs from external devices may be infeasible or otherwise difficult to implement or use.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure provides for the use of application interfaces that allow a user to interact with a work space available to the user. For example, in certain implementations, an application interface is provided on an electronic device that includes a touch screen interface. In such an example, the application interface may include a defined display area that include one or more discrete works spaces with which a user interacts, such as rows and/or columns. In this example, the user can interact with the touch screen interface to drag or pull the defined display area beyond the defined scrollview or limitations associated with the application (i.e., an overscroll). In response to the overscroll event, the application may perform a specific action, such as adding one or more discrete work spaces (e.g., a row or a column) to the display area or performing a computational task. Thus, in one implementation, a user can add a row or a column to a defined work space with which he is interacting without utilizing a separate input device (e.g., a mouse or keyboard) and without interacting with a menu or other control interface structure. Likewise, the addition of the row or column is not based on any interaction with existing rows or columns.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates to providing an application interface which may be used to add a row, column, or other discrete work spaces where data may be entered and/or manipulated. In certain implementations, a defined display area of the application interface is manipulated by a user to in an overscroll interaction whereby the defined display area is moved at least partially off beyond the scrollview limits associated with conventional interaction (e.g., data entry, manipulation, or review) with the display area. In response to the overscroll event, the application may add one or more rows and/or columns to the defined display area. The user may then enter data into or otherwise interact with the added row or column.

Figure 1:
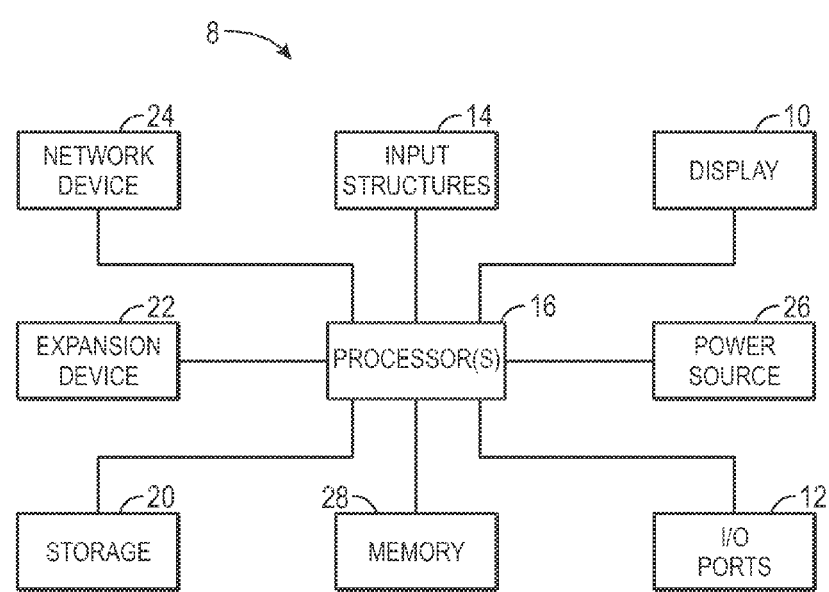
FIG. 1 is a block diagram of components of an example of an electronic device, in accordance with aspects of the present disclosure.
Figure 2:
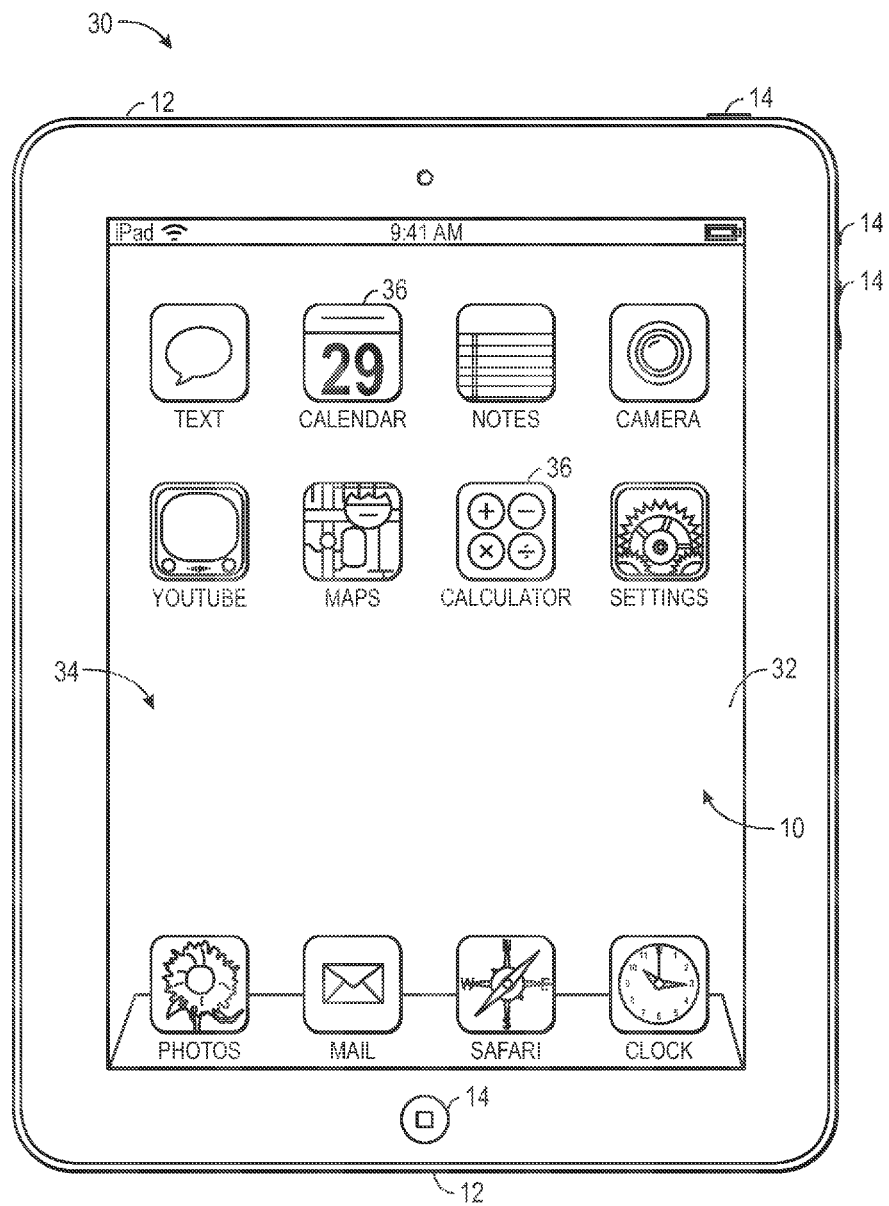
FIG. 2 is a perspective view of an example of a tablet computer electronic device, in accordance with aspects of the present disclosure.

With the foregoing in mind, a general description is provided below of suitable electronic devices that may be used to implement an application having such functionality. In particular, FIG. 1 is a block diagram depicting various components that may be present in an electronic device suitable for executing an application having an interface, as described herein. FIG. 2 illustrates a front view of an implementation of one such suitable electronic device, which may be, as illustrated, a handheld electronic device (e.g., a tablet computer, cellular telephone, media player) having a touch screen interface.

An example of an electronic device suitable for the techniques described herein may include various internal and/or external components. For example, FIG. 1 is a block diagram illustrating the components that may be present in such an electronic device 8, allowing the electronic device 8 to function. The various functional blocks shown in FIG. 1 may comprise hardware elements (including circuitry), software elements (including computer code stored on a computer-readable medium), or a combination of both hardware and software elements. It should further be noted that FIG. 1 is merely one example of a particular implementation and is intended to illustrate the types of components that may be present in a device 8. For example, in the presently illustrated embodiment, these components may include a display 10, I/O ports 12, input structures 14, one or more processors 16, a memory device 18, a non-volatile storage 20, expansion card(s) 22, a networking device 24, and a power source 26.

With regard to each of these components, the display 10 may be used to display various images generated by the device 8. The display 10 may be an LCD, OLED-type display, or other suitable display device. Additionally, in certain embodiments of the electronic device 8, the display 10 may be provided in conjunction with a touch-sensitive element, such as a touchscreen, that may be used as part of the control interface for the device 8.

The I/O ports 12 may include ports configured to connect to a variety of external devices, such as a power source, headset or headphones, or other electronic devices (such as handheld devices and/or computers, printers, projectors, external displays, modems, docking stations, and so forth). The I/O ports 12 may support any interface type, such as a universal serial bus (USB) port, a video port, a serial connection port, an IEEE-1394 or Firewire™ port, a Thunderbolt™ port, an Ethernet or modem port, and/or an AC/DC power connection port.

The input structures 14 may include the various devices, circuitry, and pathways by which user input or feedback is provided to the processor 16. Such input structures 14 may be configured to control a function of the device 8, applications running on the device 8, and/or any interfaces or devices connected to or used by the electronic device 8. For example, the input structures 14 may allow a user to navigate a displayed user interface or application interface. Examples of the input structures 14 may include buttons, sliders, switches, control pads, keys, knobs, scroll wheels, keyboards, mice, touchpads, internal accelerometers, and so forth.

In certain embodiments, an input structure 14 and display 10 may be provided together, such as in the case of a touch-screen where a touch sensitive mechanism is provided in conjunction with the display 10. In such embodiments, the user may select or interact with displayed interface elements via the touch sensitive mechanism. In this way, the displayed interface may provide interactive functionality, allowing a user to navigate the displayed interface by touching the display 10.

User interaction with the input structures 14, such as to interact with a user or application interface displayed on the display 10, may generate electrical signals indicative of the user input. These input signals may be routed via suitable pathways, such as an input hub or bus, to the processor(s) 16 for further processing.

The processor(s) 16 may provide the processing capability to execute the operating system, programs, user and application interfaces (e.g., an e-book user interface), and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more central processing units (CPUs), physics processors, graphics processors, video processors, audio processors and/or related chip sets.

The instructions or data to be processed by the processor(s) 16 may be stored in a computer-readable medium, such as a memory 18. Such a memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware for the electronic device 8 (such as a basic input/output instruction or operating system instructions), various programs, applications, or routines executed on the electronic device 8, user interface functions, processor functions, and so forth. In addition, the memory 18 may be used for buffering or caching during operation of the electronic device 8.

The components may further include other forms of computer-readable media, such as a non-volatile storage 20, for persistent storage of data and/or instructions. The non-volatile storage 20 may include flash memory, a hard drive, or any other optical, magnetic, and/or solid-state storage media. The non-volatile storage 20 may be used to store firmware, data files, software, hardware configuration information, and any other suitable data.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable connector, and may be accessed internally or external to the housing of the electronic device 8. For example, in one embodiment, the expansion card 22 may be a flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard; any 2G, 3G, or 4G cellular data standard; or any other suitable wireless networking standard. The network device 24 may allow the electronic device 8 to communicate over a network, such as a Local Area Network (LAN), Wide Area Network (WAN), or the Internet. Further, the electronic device 8 may connect to and send or receive data with any device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery or other type of suitable battery. The battery may be user-removable or may be secured within the housing of the electronic device 8 and may be rechargeable. Additionally, the power source 26 may include AC power, such as provided by an electrical outlet, and the electronic device 8 may be connected to the power source 26 via a power adapter. This power adapter may also be used to recharge one or more batteries, if present.

With the foregoing in mind, FIG. 2 illustrates an electronic device 8 in the form of a handheld device 30, here a tablet computer. By way of example, the handheld device 30 may be a model of an iPad®, iPod®, or iPhone® available from Apple Inc. of Cupertino, Calif. It should be noted that while the depicted handheld device 30 is provided in the context of a tablet computer, other types of handheld devices (such as cellular telephones, media players for playing music and/or video, personal data organizers, handheld game platforms, electronic books, handheld GPS navigation units, and/or combinations of such devices) may also be suitably provided as the electronic device 8. Further, a suitable handheld device 30 may incorporate the functionality of one or more types of devices, such as a media player, a cellular phone, a gaming platform, an electronic book, a personal data organizer, and so forth.

In the depicted embodiment, the handheld device 30 is in the form of a tablet computer that may provide various functionalities (such as the ability to take pictures, record audio and/or video, listen to music, play games, map travel routes, and so forth). As discussed herein, one functionality provided by the handheld device 30 may be the execution of applications or routines, which may include the display of an application interface on display 10.

As discussed with respect to the general electronic device of FIG. 1, the handheld device 30 may allow a user to connect to and communicate through the Internet or through other networks, such as local or wide area networks. The handheld electronic device 30, may also communicate with other devices using short-range connections, such as Bluetooth and near field communication.

In the depicted embodiment, the handheld device 30 includes an enclosure or body that protects the interior components from physical damage and shields them from electromagnetic interference. The enclosure may be formed from any suitable material such as plastic, metal, or a composite material and may allow certain frequencies of electromagnetic radiation to pass through to wireless communication circuitry within the handheld device 30 to facilitate wireless communication.

In the depicted embodiment, the enclosure includes user input structures 14 through which a user may interface with the device. Each user input structure 14 may be configured to help control a device function when actuated. For example, in a table computer implementation, one or more of the input structures 14 may be configured to invoke a "home" screen or menu to be displayed, to toggle between a sleep and a wake mode, adjust the volume of audible feedback, and so forth.

In the depicted embodiment, the handheld device 30 includes a display 10 in the form of an LCD 32. The LCD 32 may be used to display a graphical user interface (GUI) 34 that allows a user to interact with the handheld device 30. The GUI 34 may include various layers, windows, screens, templates, or other graphical elements that may be displayed in all, or a portion, of the LCD 32. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touchscreen included in the display 10, or may be selected by a user input structure 14, such as a wheel or button.

The handheld electronic device 30 also may include various input and output (I/O) ports 12 that allow connection of the handheld device 30 to external devices. For example, one I/O port 12 may be a port that allows the transmission and reception of data or commands between the handheld electronic device 30 and another electronic device, such as a computer. Such an I/O port 12 may be a proprietary port from Apple Inc. or may be an open standard I/O port.

Figure 3:
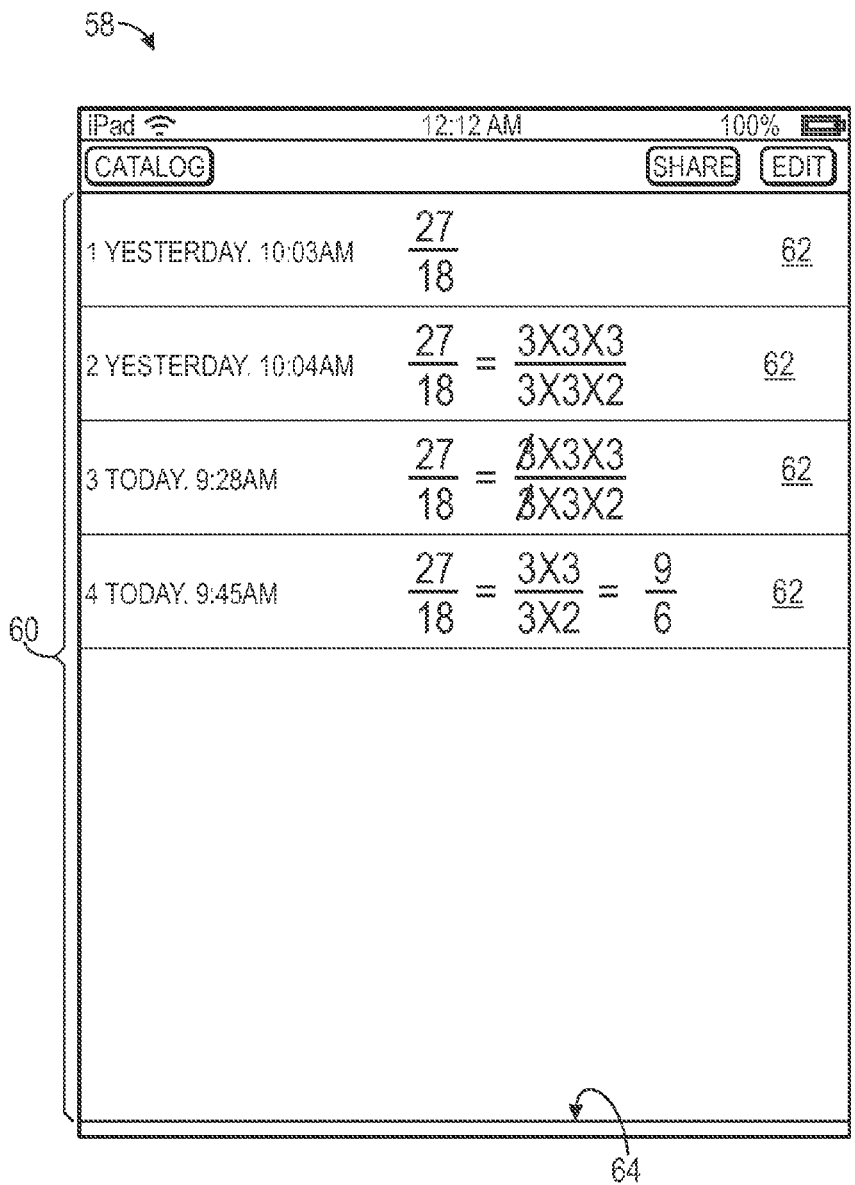
FIG. 3 depicts an application interface, in accordance with aspects of the present disclosure.

As discussed herein the electronic device 8, such as a handheld device 30, is capable of running an application having an application interface capable of being displayed on display 10. Turning to FIG. 3, in certain implementations, the application interface 58 includes a defined display area 60 on which one or more discrete work spaces 62 (e.g., rows, columns) are provided. In the depicted example, the application interface 58 is depicted as an interface for a row-by-row math scratchpad application. Thus, the respective discrete work spaces 62 correspond to rows in which a user may enter or modify a math problem being solved. That is, the rows in the depicted example correspond to sequential, discrete steps being performed by the user as part of a problem solving or data entry operation.

While FIG. 3 depicts a math scratchpad application embodiment, the approach discussed herein may be applied to any suitable application interface 58 that provides a user with discrete work spaces 62 with which to interact. Likewise, though the present example depicts the discrete work spaces 62 in the form of rows, it should be appreciated that in other embodiments the discrete work spaces 62 may take the form of columns or other defined areas provided to a user for data entry or manipulation. In certain embodiments each discrete work space 62 includes a sequence number 102 and/or time stamp 104 indicating the order in which rows were added (in the case of the sequence number 102) or the time and/or date indicating when a row (or other discrete work space 62) was added.

In the example depicted in FIG. 3, the defined display area 60 has a lower boundary 64 defining the work space provided to the user when interfacing with the application, such as for entry or modification of data in the discrete work spaces 62. As will be appreciated, the defined display area 60 of the application interface may also include an upper boundary and/or right and left boundaries. In certain implementations, such as implementations where the display 10 of the device 8 is provided as a touchscreen, a user may interact with the application interface 58 by touch, and may thereby move the defined display area 60 relative to the display 10. In other implementations, the user may interact with the application interface 58 via other input mechanisms, such as a mouse or touchpad, to accomplish the same type of movement of or interaction with the defined display area 60.

Figure 4:
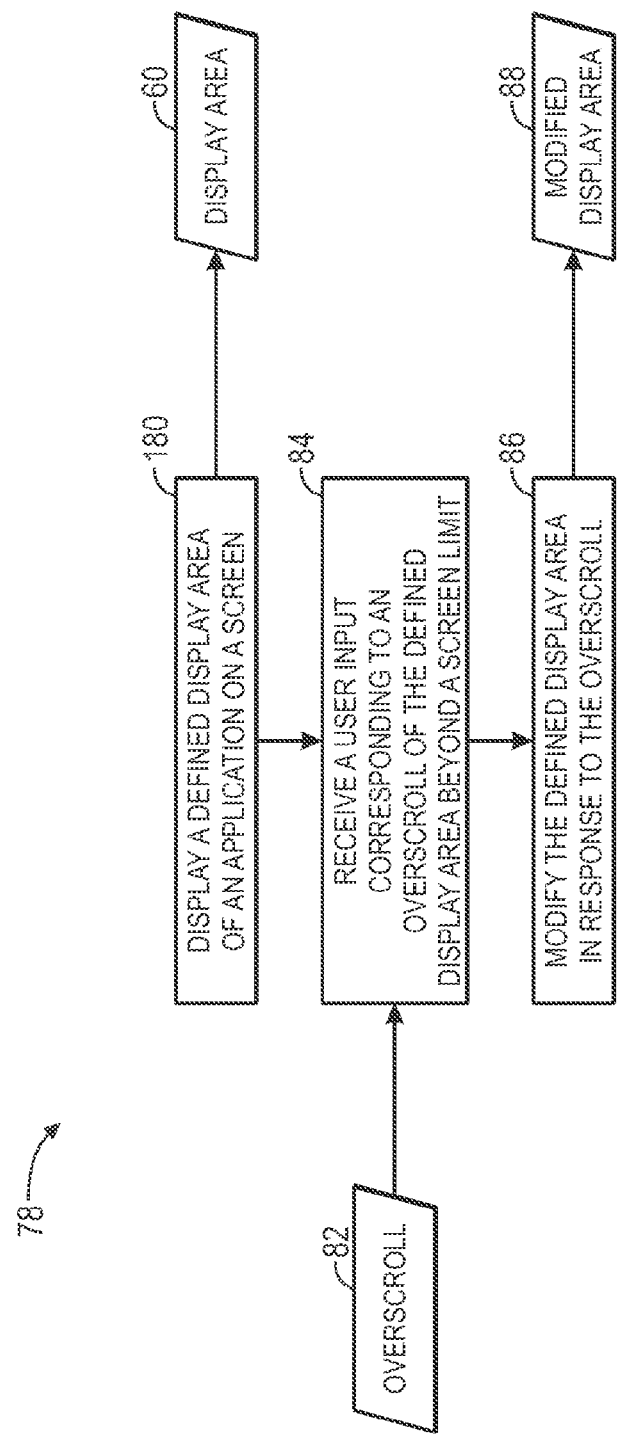
FIG. 4 depicts control logic associated with modifying a display area of an application interface, in accordance with aspects of the present disclosure.

With the application interface of FIG. 3 in mind, and turning to FIG. 4, control logic 80 is depicted for modifying the defined display area 60 of the application interface 58. As will be appreciated, the depicted control logic steps may be provided as code stored on or accessible by the device 8, such as part of the operating system of the device 8 or as part of an application capable of being executed by a processor 16 on the device 8. When executed, the code may cause the performance of the actions described herein.

Turning to FIG. 4, in the depicted example the control logic 78 initially displays (step 80) the defined display area 60 associated with an application interface 58, as depicted in FIG. 3. As discussed herein, in certain implementations the defined display area 60 includes one or more discrete work spaces 62 with which a user can interact.

In the depicted example, an input in the form of an overscroll event 82 is received or detected (step 84). As used herein, an overscroll or overscroll event 82 occurs when a user interacts with the defined display area 60 so as to cause the defined display area 60 to move or be moved beyond a limit (e.g., a defined scrollview) typically associated with the display of the defined display area 60. Upon detection of the overscroll event 82, the defined display area 60 is modified (step 86) based on one or more rules associated with the detection of the overscroll event 82. For example, in one embodiment the modified display area 88 may take the form of adding or subtracting discrete work spaces (e.g., rows and/or columns) to the defined display area 60 in accordance with one or more rules implemented by the application.

Figure 5:
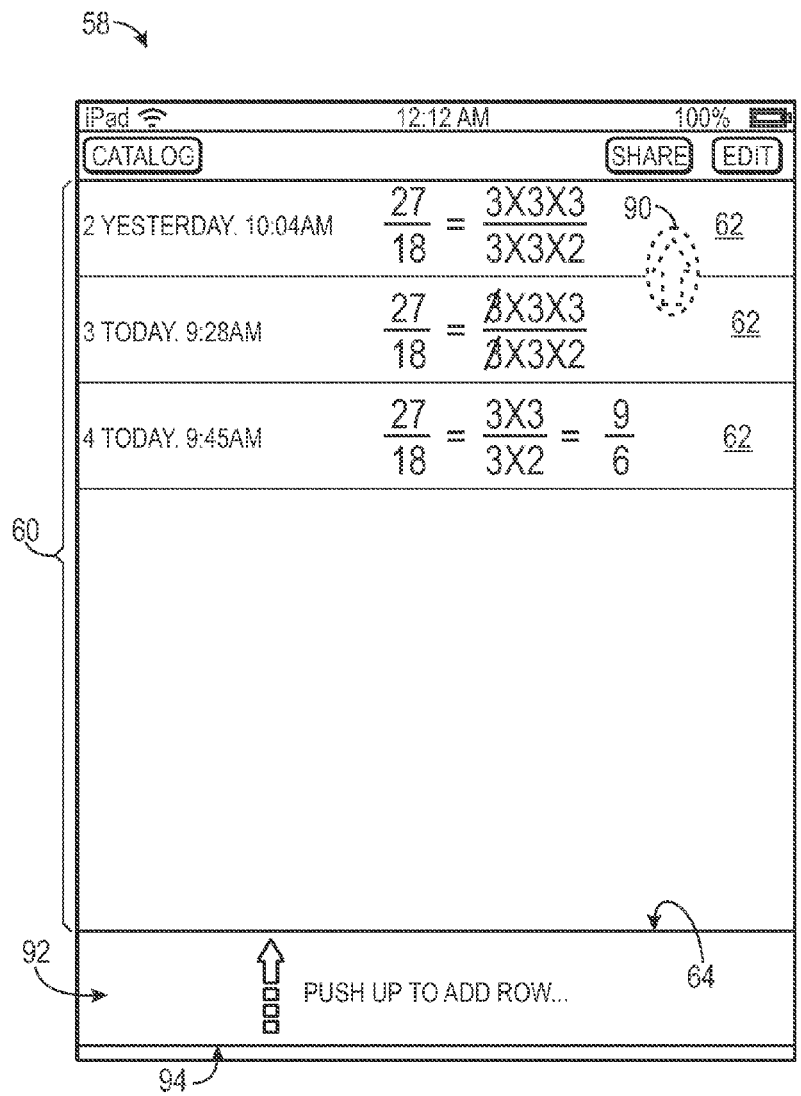
FIG. 5 depicts the application interface of FIG. 3 undergoing an overscroll event, in accordance with aspects of the present disclosure.
Figure 6:
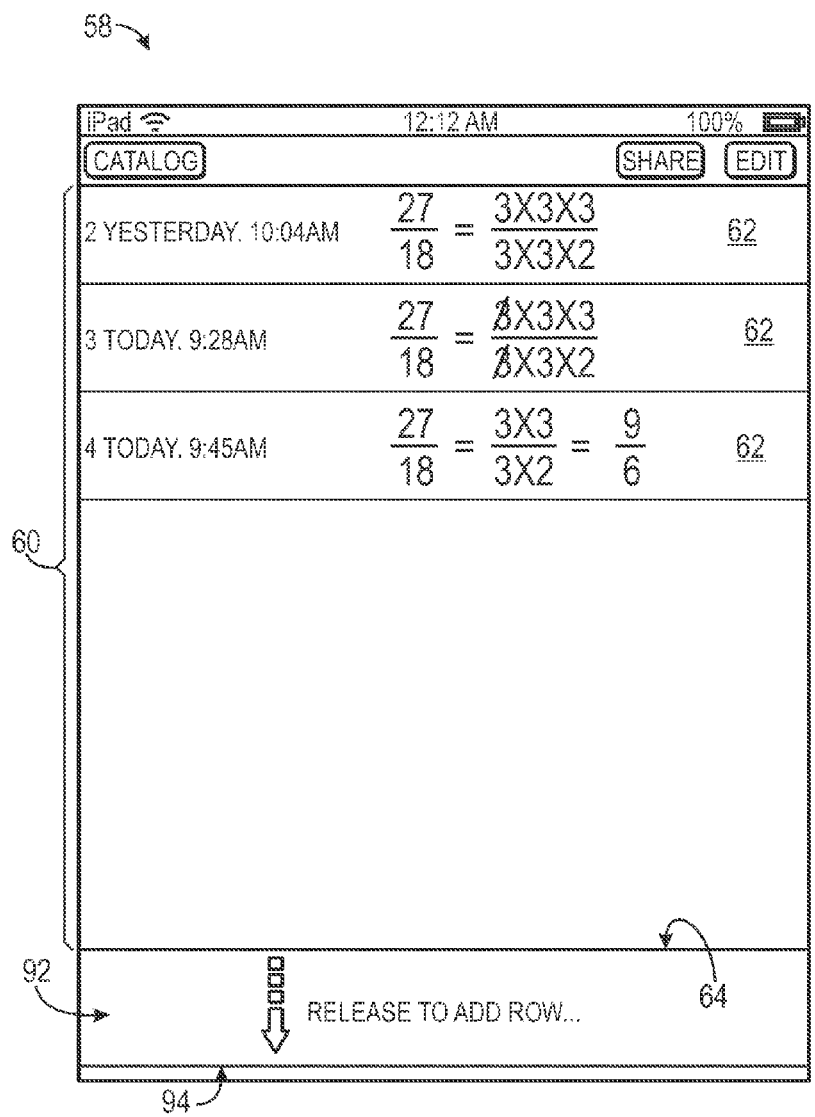
FIG. 6 depicts the application interface of FIG. 5 as the overscroll event is completed, in accordance with aspects of the present disclosure.
Figure 7:
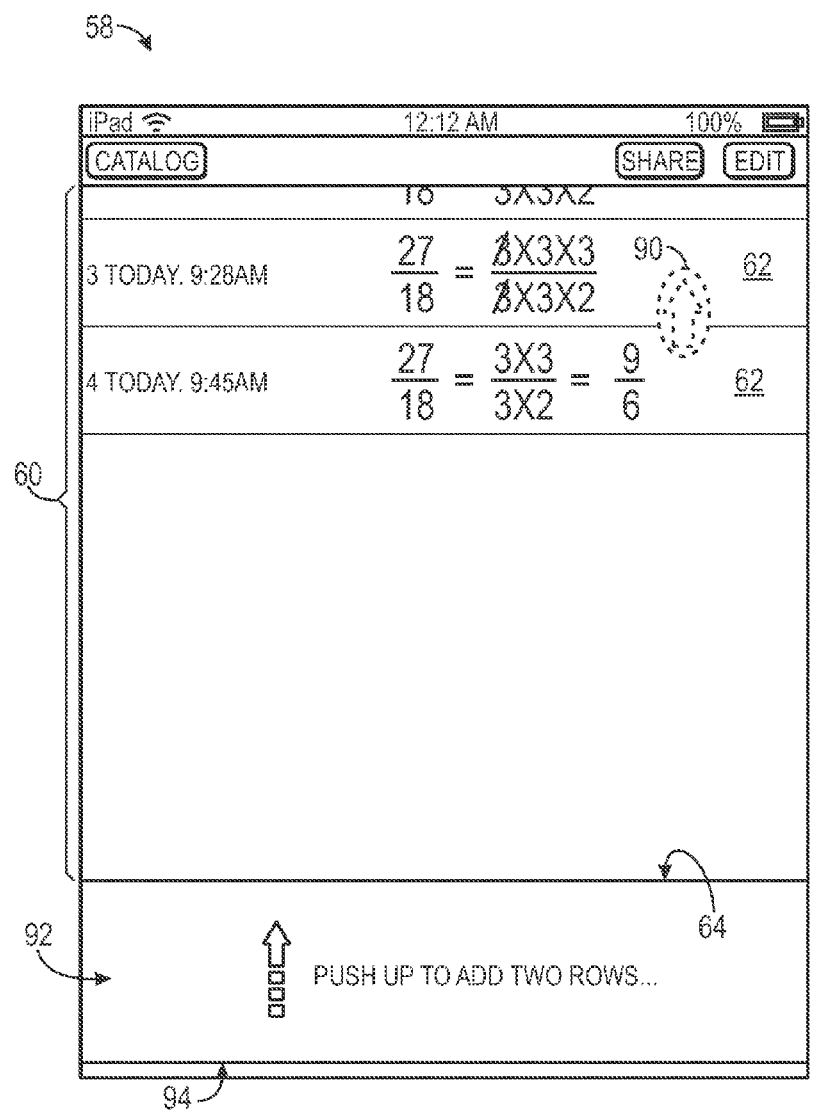
FIG. 7 depicts the application interface of FIG. 3 undergoing an extended overscroll event, in accordance with aspects of the present disclosure.
Figure 8:
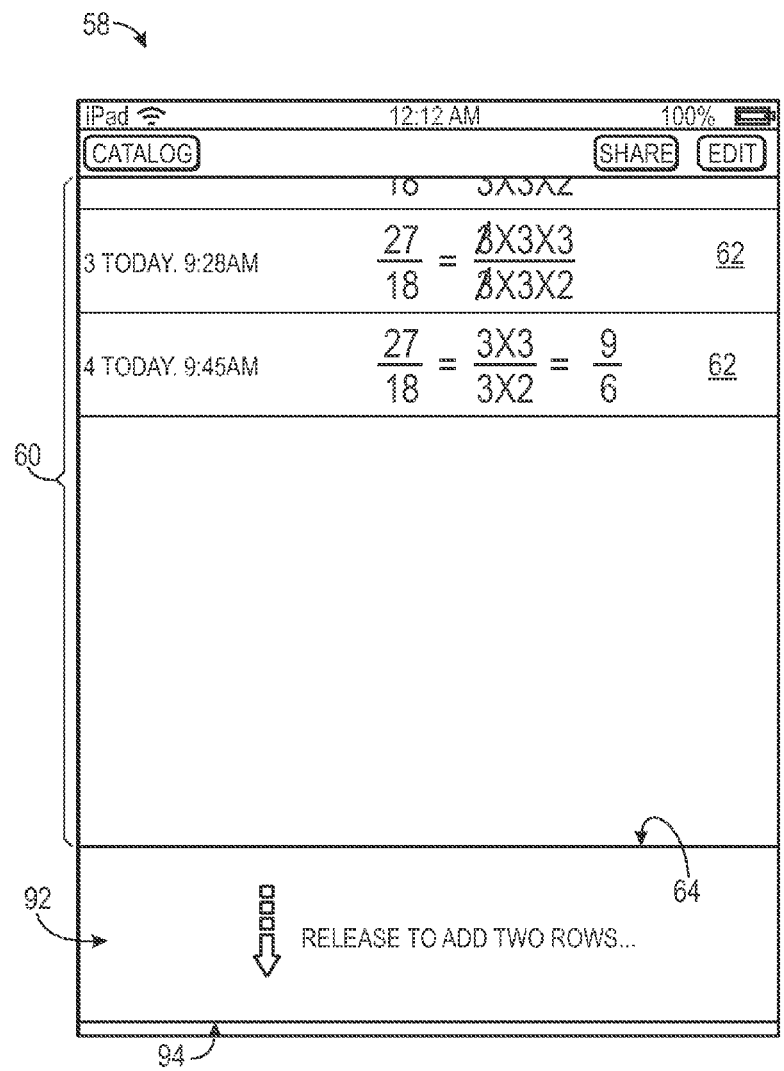
FIG. 8 depicts the application interface of FIG. 7 as the extended overscroll event is completed, in accordance with aspects of the present disclosure.

By way of example, and turning to FIGS. 5 and 6, one implementation of an overscroll event 82 is depicted. In this example, the application interface 58 is depicted as being displayed on a touchscreen interface, such as may be present on a tablet computer or cellular telephone. To accomplish the overscroll 82, a user may touch the defined display area 60 and drag (denoted by touch spot and upward arrow 90) the defined display area 60 upward such that the lower boundary 64 of the defined display area 60 is pulled beyond the limit with which it is associated during normal user interactions with the application. In the depicted example, the occurrence of the overscroll event 82 is indicated by a message 92 displayed between the lower boundary 64 of the defined display area 60 and the limit 94 (e.g., a scrollview limit) typically associated with the display of the defined display area 60 when no overscroll event 82 is occurring. In the depicted example, the message 92 provides instructions for adding a row (i.e., discrete work space 62) to the defined display area 60. In particular, as depicted in FIG. 5, the message 92 instructs the user to drag the defined display area upward relative to the display 10 until some threshold is reached. Once the threshold is reached, the message 92 changes (as depicted in FIG. 6) to instruct the user to release the defined display area 60 (indicated by the absence of touch spot 90), thus completing the overscroll event 82 and allowing the defined display area 60 to return to its normal position where the lower boundary 64 of the display area 60 is adjacent the display limit 94.

In certain implementations, an overscroll event may be associated with alternative actions or more than one threshold for action. For example, turning to FIGS. 7 and 8, the user is depicted (via touch spot 90) as having dragged the defined display area 60 further upward (i.e., away from limit 94), thereby exceeding a secondary threshold. Release of the defined display area 60 when past the secondary threshold results in an alternative action being performed as compared to when the defined display area 60 is released when only the first threshold is exceeded. For example, as depicted in FIGS. 5-8, when a user pulls the defined display area up a first distance (FIGS. 5 and 6), a first action (e.g., insertion of a row) is described by message 92 as being performed upon completion of the overscroll event 82. However, when a user pulls the defined display area up a second, greater distance (FIGS. 7 and 8), a second action (e.g., insertion of two rows) is described by message 92 as being performed upon completion of the overscroll event 82. Thus, in this example, an overscroll event of a first, limited extent adds a row to the defined display area 60 while an overscroll event of a second, greater extent adds two rows to the defined display area 60.

As will be appreciated, in other implementations other events may be associated with different extents of overscroll events 82. Likewise, overscroll events performed relative to different edges of the display area may be associated with different actions. For example, an overscroll event 82 associated with a right or left edges of the display (i.e., the right or left limits of the display or screen) may be associated with the addition or removal of columns to the defined display area 60. Likewise, an overscroll event 82 associated with the upper edge or limit of the display may be associated with the removal of one or more rows from the defined display area.

Figure 9:
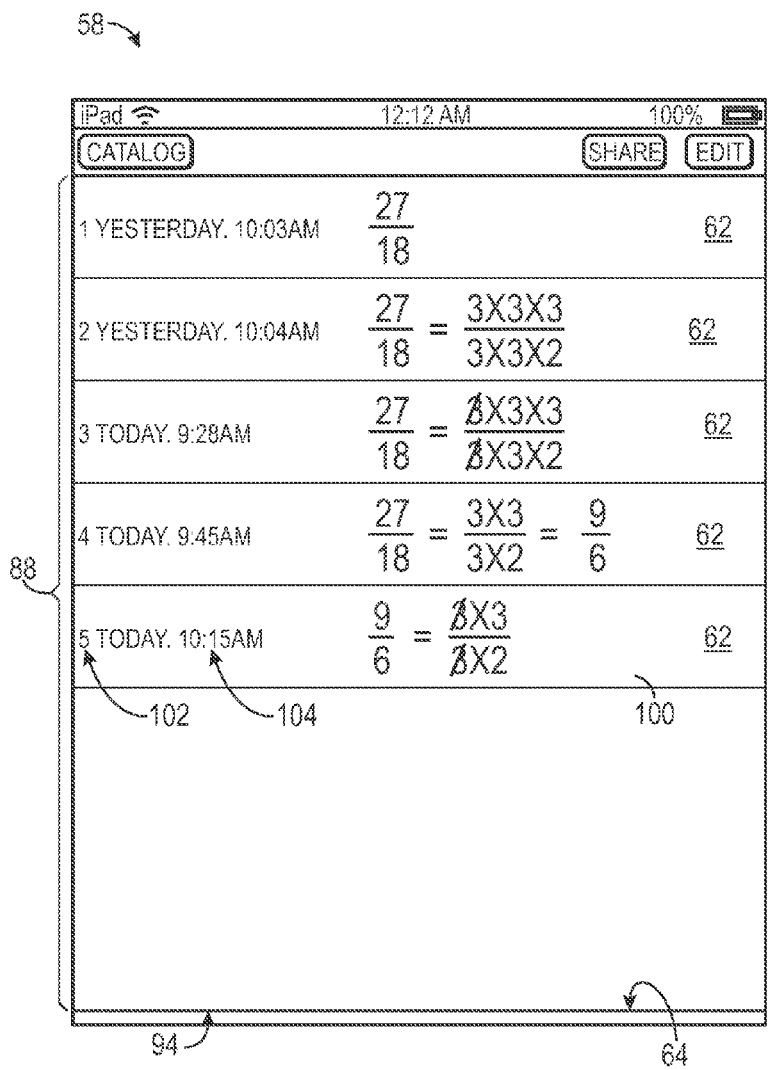
FIG. 9. depicts the application interface of FIG. 6 upon completion of the overscroll event and modification of the display area, in accordance with aspects of the present disclosure.

Turning back to the example provided in FIGS. 5 and 6, FIG. 9 depicts the defined display area 60 upon completion of the overscroll event 82. In this case, in response to the overscroll event 82, a new row 100 has been added to the defined display area 60. In one example, the new row 100 duplicates the contents of the preceding row, thereby allowing the user to easily change or modify the content of the preceding row, such as a mathematical problem. In other implementations the new row 100 may be blank when added, allowing the user to generate new content in the added row (or other discrete work space 62).

However, in the example depicted in FIG. 9, the new row 100 (or other discrete work space that is added) displays the result of a calculation or operation performed on the content of the defined display area 60. For example, the new row 100 may display the result of a computation performed based upon the contents of the preceding row or the next step in a mathematical operation. In one such embodiment, the message 92 while the overscroll event 82 is performed may indicate to the user that a calculation of other operation will be performed in response to the overscroll 82. The result of the operation may then be displayed as new row 100.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for modifying a displayed application interface, the method comprising:
   displaying a defined display area of an application interface on a screen of an electronic device, wherein the defined display area comprises one or more discrete work spaces, wherein the discrete work spaces depict a sequence of steps of a mathematical problem to be solved or a mathematical operation to be performed;
   detecting, on the electronic device, a user input corresponding to an overscroll event; and
   in response to the overscroll event, generating a new discrete work space in the defined display area, wherein the new discrete work space is populated, when generated, with a next step in the sequence of steps of the mathematical problem or the mathematical operation.

2. The method of claim 1 wherein the discrete work spaces comprise rows or columns.

3. The method of claim 1, wherein the defined display area is displayed on a touchscreen of the electronic device.

4. The method of claim 1, wherein the overscroll event corresponds to an input that moves the defined display area beyond a limit associated with the display of the defined display area.

5. The method of claim 1, comprising displaying a message while the overscroll event is being performed providing instructions to a user.

6. The method of claim 5, wherein the message is displayed between the defined display area and a limit typically associated with the display of the defined display area.

7. An electronic device, comprising:
a memory storing one or more routines; and
a processing component configured to execute the one or more routines stored in the memory, wherein the one or more routines, when executed by the processing component provide an application interface, wherein the application interface:
displays a defined display area comprising one or more discrete work spaces, wherein the discrete work spaces depict a sequence of steps of a mathematical problem to be solved or a mathematical operation to be performed;
detects an input that moves the defined display area beyond a scroll view limit associated with the display of the defined display area; and
modifies the defined display area in response to the detected input to generate a modified display area having an additional discrete work spaces, wherein the additional discrete work space is populated, when generated, with a next step in the sequence of steps of the mathematical problem or the mathematical operation.

8. The electronic device of claim 7, wherein the discrete work spaces comprise rows or columns.

9. The electronic device of claim 7, wherein the input comprises an overscroll event.

10. The electronic device of claim 7, wherein the application interface, in conjunction with detecting the input, displays a message related to the modification to be applied to the defined display area.

11. A non-transitory, computer-readable medium configured to store one or more routines executable by a processor of an electronic device, the routines, when executed, causing acts to be performed comprising:
displaying a display area comprising one or more discrete work spaces, wherein the display area comprises a boundary that is displayed adjacent to a display limit when a user interacts with the one or more discrete work spaces, wherein the discrete work spaces depict a sequence of steps of a mathematical problem to be solved or a mathematical operation to be performed;
detecting a user interaction that moves the display area such that the boundary of the display area moves away from the display limit;
upon detection of the user interaction, modifying the display area to generate a new discrete work space, wherein the new discrete work space is populated, when generated, with a next step in the sequence of steps of the mathematical problem or the mathematical operation.

12. The non-transitory, computer-readable medium of claim 11, wherein the number of discrete works spaces added to the display area is determined at least in part based on a distance the display area is moved relative to the display limit.

13. The non-transitory, computer-readable medium of claim 11, wherein the routines, when executed, cause acts to be performed comprising:
displaying a message related to the modification to be performed on the display area.

14. The non-transitory, computer-readable medium of claim 11, wherein the discrete work spaces comprise one or both of rows or columns.

* * * * *